(12) United States Patent
Barrett et al.

(10) Patent No.: US 7,798,124 B2
(45) Date of Patent: Sep. 21, 2010

(54) METHOD AND SYSTEM FOR CLOSED LOOP COMBUSTION CONTROL OF A LEAN-BURN RECIPROCATING ENGINE USING IONIZATION DETECTION

(75) Inventors: Jeffrey B. Barrett, Bolton, MA (US); Suraj Nair, Fort Collins, CO (US); Ed VanDyne, Loveland, CO (US); Luigi Tozzi, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 340 days.

(21) Appl. No.: 11/864,820

(22) Filed: Sep. 28, 2007

(65) Prior Publication Data
US 2008/0078359 A1 Apr. 3, 2008

Related U.S. Application Data

(60) Provisional application No. 60/827,364, filed on Sep. 28, 2006, provisional application No. 60/973,276, filed on Sep. 18, 2007.

(51) Int. Cl.
*F02P 5/00* (2006.01)
*F02P 5/06* (2006.01)

(52) U.S. Cl. .............................. 123/406.37

(58) Field of Classification Search ............ 123/406.37, 123/536, 169 R, 310, 406.12; 701/111; 73/114.62, 114.63, 114.67
See application file for complete search history.

(56) References Cited

U.S. PATENT DOCUMENTS

| | | | |
|---|---|---|---|
| 4,417,556 A | 11/1983 | Latsch | |
| 4,565,087 A | 1/1986 | Damson et al. | |
| 4,716,874 A * | 1/1988 | Hilliard et al. | 123/406.14 |
| 5,197,448 A | 3/1993 | Porreca et al. | |
| 5,425,339 A | 6/1995 | Fukui | |
| 5,676,113 A | 10/1997 | Johansson et al. | |
| 5,777,216 A | 7/1998 | Van Duyne et al. | |
| 5,803,047 A * | 9/1998 | Rask | 123/406.37 |
| 5,828,217 A * | 10/1998 | Inagaki et al. | 324/393 |
| 5,896,842 A | 4/1999 | Abusamra | |
| 5,959,192 A * | 9/1999 | Mogi et al. | 73/35.08 |

(Continued)

FOREIGN PATENT DOCUMENTS

SE 504197 C2 12/1996

(Continued)

*Primary Examiner*—Mahmoud Gimie
(74) *Attorney, Agent, or Firm*—Ziolkowski Patent Solutions Group, SC

(57) ABSTRACT

A system and method for controlling knock in a lean burn internal combustion (IC) engine includes a spark plug having an electrode, an electrical circuit, and a controller. The electrical circuit is configured to provide a first voltage to the electrode and detect an ion current during a thermal-ionization phase of the combustion process, and provide a second voltage to the electrode to create a spark and initiate a combustion process within the combustion chamber. The controller is configured to monitor the ion current for a knock condition that includes at least an incipient knock condition, determine a crank angle of the IC engine where the incipient knock occurs, and adjust timing of the IC engine to operate at a crank angle that does not exceed a threshold level beyond inception of incipient knock.

20 Claims, 11 Drawing Sheets

U.S. PATENT DOCUMENTS

| | | |
|---|---|---|
| 5,992,386 A | 11/1999 | Nytomt et al. |
| 6,029,627 A | 2/2000 | VanDyne |
| 6,222,367 B1 * | 4/2001 | Shimizu et al. ............. 324/380 |
| 6,321,733 B1 * | 11/2001 | Suckewer et al. ........... 123/620 |
| 6,742,499 B2 | 6/2004 | Viele et al. |
| 6,779,517 B2 * | 8/2004 | Sakakura .................... 123/630 |
| 6,786,200 B2 | 9/2004 | Viele et al. |
| 6,874,464 B2 | 4/2005 | Montgomery |
| 6,931,914 B2 | 8/2005 | Dohi et al. |
| 6,935,310 B2 | 8/2005 | Viele et al. |
| 6,994,073 B2 | 2/2006 | Tozzi et al. |
| 7,174,251 B2 | 2/2007 | Iwamoto et al. |
| 2007/0069617 A1 | 3/2007 | Tozzi et al. |

FOREIGN PATENT DOCUMENTS

| | | |
|---|---|---|
| WO | 2006011950 A2 | 2/2006 |

* cited by examiner

METHOD AND SYSTEM FOR CLOSED LOOP COMBUSTION CONTROL OF A LEAN-BURN RECIPROCATING ENGINE USING IONIZATION DETECTION

CROSS REFERENCE TO RELATED APPLICATION

The present claims the benefit of U.S. Provisional Application Ser. No. 60/827,364, filed Sep. 28, 2006 and U.S. Provisional Application Ser. No. 60/973,276, filed Sep. 18, 2007.

BACKGROUND OF THE INVENTION

The present invention relates generally to spark-ignition engines, and more particularly, to optimizing lean-burn operation with the use of ionization detection in a natural gas lean-burn engine and preventing engine knock by accurately detecting incipient knock and controlling engine operation in response thereto.

Spark-ignition (SI) reciprocating engines typically have a feasible operating regime determined by air-fuel ratio and spark timing. Such engines typically operate with a safety margin of 0.5% O2, or with a 5-6 degree timing margin. Conventional spark-ignition engines typically operate near the stoichiometric air/fuel ratio and depend upon exhaust after treatment with catalytic converters to reduce the nitrogen oxide (NOx) emissions. With increased emissions standards in the recent years, the industry is moving toward lean-burn operation despite the difficulty of maintaining a stable combustion process in such engines due to a relatively large coefficient of variation (COV). By running lean (i.e. operating with an air-fuel ratio greater than 1.4), turbocharged engines can enhance fuel efficiency without sacrificing power while producing less NOx pollutants than conventional stoichiometric engine operation. However, such operation is limited by engine knock which typically occurs during lean-burn operation. In order to obtain a maximum power and optimized fuel economy for lean-burn operation, it is desirable to detect the onset of engine knock and to operate near the knock limit without damaging the engine.

Accelerometer-based knock sensors are commonly used for detecting knock in SI engines. Accelerometers are mounted to the engine block to detect the high frequency vibrations generated during knocking. However, they are highly susceptible to electrical noise, and knock sensing can be compromised by engine mechanical noises like vibrations during valve closure or piston slapping, especially at high engine speeds. Thus, the signal typically must be filtered, reducing the overall sensitivity of the sensor and hindering such sensors from detecting incipient knock. Incipient knock is defined as a miniscule knock that does not contain a knock frequency that is adverse to engine operation. In essence, sensing incipient knock as an indicator of impending knock production would be useful in controlling engine operation and avoiding knock all together.

In-cylinder pressure sensors have been used to provide direct information about the intensity of knock, which makes them more valuable for knock detection than accelerometers. However, due to the high cost of these sensors and the costs associated with setup and operation thereof, they are used mainly in laboratory settings and are not practical for high-volume field applications.

In-cylinder ion sensors have been used in recent years as a lower cost alternative to the abovementioned knock sensors. They provide a direct measure of in-cylinder thermodynamic conditions and can provide information about knock intensity. However, in lean-burn operation, because of the lean nature of the mixture, the ionized species concentration is much less than at stoichiometric conditions. Thus, integrating the signal cannot be done reliably due to a number of factors that include high levels of noise relative to the ion signal magnitude, variability of the ion signal, and low magnitudes of a resultant integrated signal. An ion sensor in a lean-burn engine also tends to exhibit great variability, typically due to changes in fuel content, temperature, and humidity. However, these systems are also not sensitive enough to detect the onset of incipient knock. For example, a knock detection system employing knock frequency measurement will only detect strong detonation, not incipient knock, as described above, which contains virtually no spectral content.

Thus, the techniques developed using ion sensors for stoichiometric operation are unsuitable for lean-burn operation and previous knock detection systems have been limited thereto.

It would therefore be desirable to have a system and method capable reliably and affordably detecting incipient knock in a SI engine and control operation of the engine to avoid entering into a frequency producing knock condition.

BRIEF DESCRIPTION OF THE INVENTION

The present invention is directed to a system and method of detecting incipient knock in a lean-burn reciprocating SI engine. An electrical circuit controls the spark plug for ignition and for detecting an ionization signal within a combustion chamber of the SI engine that is indicative of incipient knock. The incipient knock signal is used in a closed loop ignition timing control to maintain the engine at optimal efficiency devoid of any knock frequency.

In accordance with one aspect of the invention, a system for controlling knock in a lean burn internal combustion (IC) engine includes a spark plug having an electrode (or igniter), an electrical circuit, and a controller. The electrical circuit is configured to provide a first voltage to the electrode and detect an ion current during a thermal-ionization phase of the combustion process, and provide a second voltage to the electrode to create a spark and initiate a combustion process within the combustion chamber. The controller is configured to monitor the ion current for a knock condition that includes at least an incipient knock condition, determine a crank angle of the IC engine where the incipient knock occurs, and adjust timing of the IC engine to operate at a crank angle that does not exceed a threshold level beyond inception of incipient knock.

In accordance with another aspect of the invention, a method for combustion feedback control of a lean-burn reciprocating engine using ion signals includes the steps of positioning a spark plug having an electrode, the spark plug positioned within a combustion chamber and initiating combustion within the combustion chamber by providing a voltage to the electrode. The method further includes measuring an ion current using the electrode during combustion, and adjusting timing of the IC engine to within onset of incipient knock using the measured ion current to avoid engine knock.

In accordance with yet another aspect of the present invention, a closed-loop controller for a spark-ignition internal combustion (IC) engine includes a control to detect an ion current within a combustion chamber of the IC engine using an electrode of a spark plug, determine a desired crank angle for ignition from the ion current wherein incipient knock begins to occur, and continually monitor and adjust ignition timing of the IC engine to operate at or below inception of incipient knock.

In accordance with still another aspect of the present invention, a system for controlling knock in a lean burn internal combustion (IC) engine includes an electrical circuit configured to provide a first voltage to an igniter and detect an ion current during a thermal-ionization phase of the combustion process, and provide a second voltage to the igniter to create a spark and initiate a combustion process within a combustion chamber. A controller is configured to monitor the ion current for a knock condition that includes at least an incipient knock condition, determine a crank angle of the IC engine where the incipient knock occurs, and adjust timing of the IC engine to operate at a crank angle that does not exceed a threshold level beyond inception of incipient knock.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION OF THE PREFERRED EMBODIMENT

A system and method of detecting incipient knock in a lean-burn reciprocating SI engine is shown to reduce knock and operate at an improved thermal efficiency. An electrical circuit controls the spark plug for ignition and for detecting an ionization signal within a combustion chamber of the SI engine that is indicative of incipient knock. The incipient knock signal is used in a closed loop ignition timing control to maintain the engine at optimal efficiency devoid of any knock frequency.

Advancements in sensor and spark plug technology along with improved algorithms, described herein, has made it possible to obtain good quality, reliable ion signals in very lean-burn engines. Engines typically have a map of acceptable spark timings over all speeds and loads within an operating range. These timing maps are typically calibrated to avoid the knocking region by having a predetermined margin of safety.

Knock prevention and control using ion sensors can extend the available safe operating regime of an engine. The ion knock sensor thus allows the engine to be operated at a more advanced ignition timing, which is typically at a higher thermal efficiency.

The present invention relates to a system that will detect and process ion signal in a lean-burn reciprocating engine to perform various engine diagnostics, such as detecting the onset of incipient knock. For all purposes used herein, a lean-burn reciprocating engine is defined as an engine that operates having an air/fuel ratio greater than 1.4. This diagnosis can then be used in a closed loop control to allow the engine to be operated at higher efficiency by operating at lower a detonation margin. This system can also be alternatively used for closed loop ignition timing control to maintain an engine timing set point between a conservative base timing up to maximum advance for highest efficiency. The algorithms disclosed herein can be used alone in a knock prevention system, or in combination with other engine diagnostic and control systems.

Figure 1:
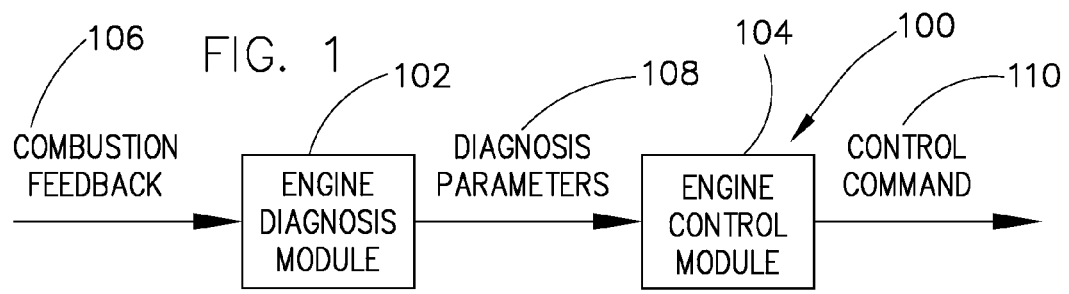
FIG. 1 is a high-level structure of a control system according to an embodiment of the present invention.

FIG. 1 shows a high-level structure of a control system 100 connecting a diagnosis module 102 and a control module 104 according to an embodiment of the invention. In general, during operation, combustion feedback 106 is fed into the engine diagnosis module 102 where it is diagnosed at 108. Based on the diagnosis parameters 108, engine control module 104 issues control commands 110 to adjust engine operation accordingly. The diagnosis module 102 can function separately with its own microprocessors or be integrated to be a part of the engine control module 104 having other inputs and outputs. Alternatively, the engine control module 104 can include for instance an ion signal analyzer, which receives the ion signal from the diagnosis module 102 and determines if knocking exists. In a preferred embodiment, the engine diagnosis module 102 provides an indication of knock to the engine control module 104, which may then determine what action to take according to embodiments of the present invention.

Figure 2:
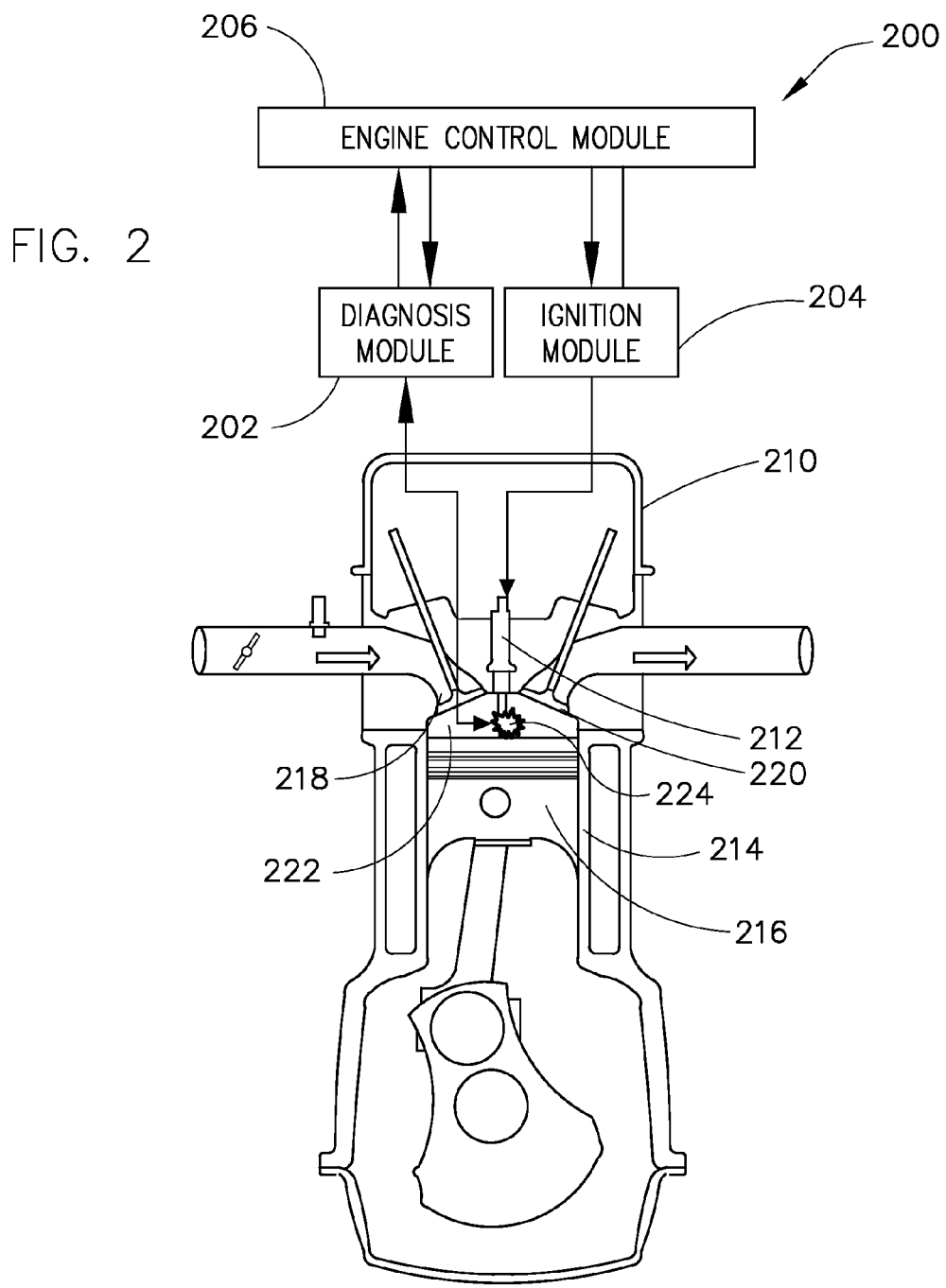
FIG. 2 illustrates a reciprocating engine having an ignition and diagnosis module according to an embodiment of the present invention.

FIG. 2 illustrates an application of system 100 of FIG. 1 in relation to a spark ignition (SI) reciprocating engine 210 according to an embodiment of the present invention. System 200 includes a diagnosis module 202 and an ignition module 204 which are controlled by an engine control module 206. The diagnosis module 202, in this embodiment, senses ion current which occurs in a gap of a spark plug 212. These modules 202, 204, 206 can function alone or be combined into a single module, or they can be part of an engine controller having other inputs and outputs. The reciprocating engine 210 includes an engine cylinder 214, a piston 216, an intake valve 218 and an exhaust valve 220.

In a typical four-stroke spark-ignited engine, the operation can be divided into four cycles: intake, compression, expansion and exhaust. Near the end of the compression cycle, referring still to FIG. 2, the spark plug 212 ignites an air/fuel mixture contained in the cylinder 214 at 222, which initiates combustion 224. During combustion, free ions are generated which are electrically conductive and can be measured by applying a voltage across an ion probe. Because a spark plug works well as an ion probe, a voltage may be applied across the gap of the spark plug 212 to measure an ion current within the combustion cylinder 214 during a combustion event. Using the spark plug 212 as the ion probe eliminates the need for an additional sensor in the cylinder. The ion current may be measured in the engine diagnosis module 202 and contains circuitry for detecting and analyzing the ion signal. In a preferred embodiment, the diagnosis module 202 supplies power to the spark plug 212 after the air and fuel mixture is ignited, and also measures ion signals that occur in the spark gap. Alternatively a conventional ion probe or other conventional device to detect ions may be used to measure the ion signals that occur during combustion.

The following terms and definitions are applicable in this document for purposes of clarity:

Normal engine operation. At a normal or conservative ignition timing, in-cylinder measurements would show some normal distribution or sigma of ion and pressure peak locations and magnitudes over a number of combustion cycles. This distribution varies somewhat within some typical range for a given engine and operating condition. In general these are indicators of the repeatability of combustion from cycle to cycle.

Incipient knock. As timing is advanced from a normal or conservative setting, peak pressure and ion distributions may vary slightly. However, at the onset of knock (or incipiency) the peak location distribution, or sigma, increases measurably and more specifically may become skewed toward advancing crank angle degrees i.e. (a non-symmetrical distribution). An ion or pressure waveform starts to show signs of more rapid (or uncharacteristic) pressure rise as incipiency is approached. In the combustion process, knock occurs as the in-cylinder pressure and temperature increases such that after the initiation of combustion by the spark, a spontaneous second ignition takes place due to the increase in pressure and temperature. For the purpose of the ongoing discussion, incipient knock is defined as a small secondary spontaneous ignition resulting in an increase in the distribution of pressure and ion peak locations that does not result in a knock frequency. Knock frequency is commonly understood within the art. For incipient knock the secondary spontaneous ignition results in a small pressure wave traveling through the combustion chamber, but not of sufficient magnitude to be reflected by combustion chamber surfaces resulting in pressure oscillations.

Classic, moderate, and hard knock. These refer to the presence of knock frequency content in the ion or pressure waveform as is commonly understood within the art. The knock frequency corresponds to the resonant frequency of the combustion chamber at the given in-cylinder conditions i.e. (pressure). Knock frequency is typically observed when the secondary spontaneous ignition is of sufficient magnitude to be reflected by combustion chamber surfaces and result in pressure oscillations. Most knock detection systems require a minimum of several cycles of knock frequency to be present for valid knock detection.

Ion currents measured in lean burn engines are typically on the order of tens of nano-amps. Circuitry for measuring ion currents within an IC engine, however, has been typically developed for stoichiometric engine operation and is not capable of accurately measuring such signal levels during lean burn operation. In addition, the number of cylinders is often greater than typical stoichiometric engines. This high cylinder count can cause the timing of the sparking cylinders and ion sensing cylinders to overlap, thus causing electromagnetic interference (EMI) or cross-talk to occur in the ion sensing circuit when the spark plugs are fired in a neighboring cylinder or cylinders. Ignition coil primary drive currents are typically in the range of 30 to 40 amps. On the secondary of the coil, very short duration currents associated with the spark breakdown can be on the order of 100 amps or more. The resulting arc current forms in about a nanosecond, and in this very short time the spark plug gap voltage drops from roughly 30 to 40 Kilovolts to less than 100 volts. This very large and fast current edge creates another source of strong EMI. Furthermore, noise present on the combustion ion waveform can cause combustion detection algorithms to produce erroneous results. Thus the development of an ion sensing system for high-cylinder-count lean burn engines presents considerable challenges.

Figure 3:
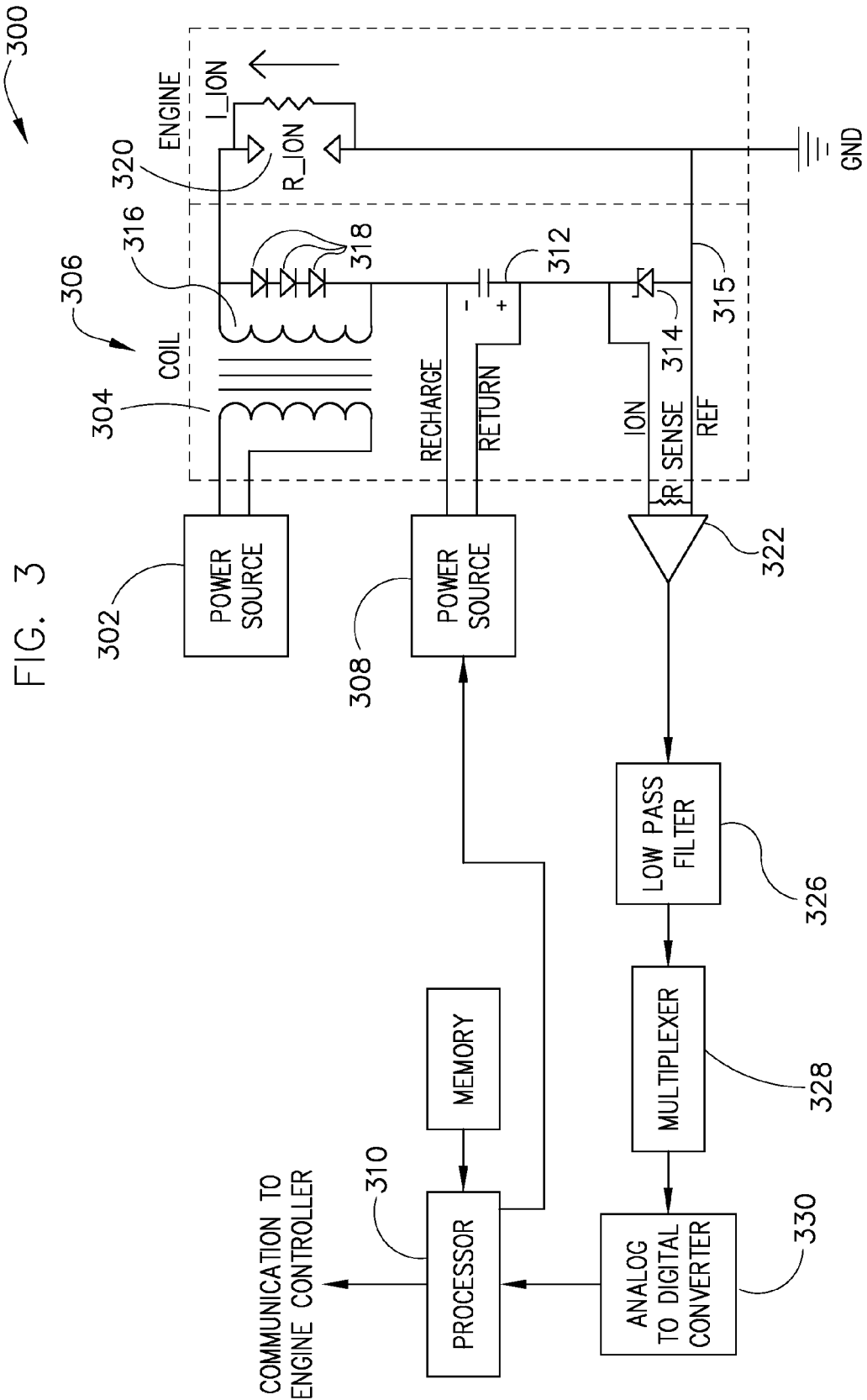
FIG. 3 is an electrical circuit providing spark voltage and ion measurement bias according to an embodiment of the present invention.

Referring to FIGS. 2 and 3, a capacitive discharge ignition (CDI) is illustrated using electrical circuit 300 that charges one or more large capacitors 302 to typically 300 volts. As is customary, the engine control module 206 receives engine information through several sensors, the most important of which is a crank angle position detector. This detector supplies pulses to the ignition module 204 and engine control module 206 at specific crank angle increments. The control modules 204, 206 can therefore precisely time control actions to the present engine crank angle. The ignition module 204 can thereby fire the cylinder spark plugs (i.e. 212 of FIG. 2) at the desired timing for correct engine operation. When the firing time of a given cylinder is determined, the 300 volt charge on the capacitor 302 is connected to the primary 304 of an ignition coil 306. The ignition coil 306, or step up transformer, increases the voltage to around 40 kilovolts, which is sufficient to cause the spark gap 320 to breakdown or start to arc. The arc ignites the fuel and air mixture causing the desired combustion process. The ignition module 204 cycles through all cylinders in the engine, firing them in the proper order and then repeats the sequence. Shortly after the spark duration is complete, the ion bias energy source 308 is energized to commence the process of measuring the ion current for the cylinder just fired. At this point the ignition module 204 is preparing to fire the next cylinder in the firing order. The diagnosis module 202 commences operation of bias energy source and the ion detection circuits for the cylinder just ignited.

A capacitor 312 within the ion detection circuits is recharged to provide the desired ion bias voltage. Once an ion bias is present on the spark gap 320, ion current measurement can commence. The diagnosis module 202 senses the ion current, amplifies it and digitizes it for processing. If an incipient knock is detected on a cylinder, the diagnosis module will report the knock to the engine control module 206 after the completion of the combustion cycle for that cylinder. One skilled in the art would recognize that, although the diagnosis module 202 may control separate bias supplies and ion detection circuits for all cylinders, corrective algorithms may be performed by a common single processor or several processors.

The engine control module 206 receives inputs from various engine sensors and other plant systems and maintains desired engine operating parameters. Upon receiving a combustion feedback parameter from the diagnosis module 202, the engine control module 206 determines the correct control response. For example when it receives indication of incipient knock detected in a cylinder, the engine control module 206 may determine the proper control action is to retard the timing by, for instance, 0.5 degrees. It would then signal the ignition module 204 to retard the timing on the cylinder by 0.5 degrees. One skilled in the art would recognize that other control responses are also possible. For example if several knocking engine cycles have been detected and several attempts to retard the timing have failed to prevent the knock, the engine control module 206 may shut down the engine.

FIG. 3 illustrates a detailed view of an electrical circuit 300 for providing engine ignition and diagnosis according to an embodiment of the present invention. A first power source 302 is shown connected to the primary windings 304 of an ignition coil 306. A second power source 308 is shown as the ion bias recharge supply. On command from a processor 310, the second power source 308 recharges a capacitor 312 within the coil 306 to, for instance, 400 volts. The second power source 308 turns off and the capacitor 312 supplies a bias to the ion current loop formed by the capacitor 312, a zener diode 314, a secondary winding in the coil 316, one or more high voltage diodes 318, an electrical path 315, and a spark gap 320. The bias thereby enhances ion current flow through the spark gap 320 if combustion is present. The ion current passes through an amplifier 322. The ion signal proceeds through a low pass filter 326. This is typically a second or third order 20 kHz low pass filter.

It is generally desirable to allow knock frequency to pass through to the processor 310 if present during more severe knock conditions. Knock frequencies are generally in the range of 2 to 6 KHz, but may also contain additional harmonics at two to three times this frequency. Therefore the filter characteristics of filter 326 are chosen to attenuate, typically, greater than 20 kHz signals, which tend to be noise. Thus, the low pass filter 326 may prevent noise from being falsely detected as knock or other combustion characteristics.

Referring still to FIG. 3, a multiplexer 328 is illustrated which typically switches to the next cylinder in the firing order when 1) the combustion has been initiated in a cylinder, 2) the bias recharge event has taken place, and 3) it is time to start digitizing the ion current waveform. For example, in a 16 cylinder engine, the multiplexer 328 would switch from one cylinder to the next in sequence with the engine firing order. In some cases where the cylinders are closely spaced, it may be desirable to utilize a two-bank architecture in the diagnosis module 202 as illustrated in FIG. 2. That is, there may be one multiplexer 328, an analog to digital converter (ADC) 330, and processor 310 for each bank providing the capability for simultaneously processing to two ion waveforms.

The ADC 330 samples the filtered and processed ion current waveform and converts it to digital format for use by the processor 310. The ADC 330 typically samples the ion current waveform at a high enough rate such that the true characteristics of the sampled waveform can be evaluated by control algorithms, or if necessary the ion waveform can be reproduced in real time by a digital to analog converter (DAC) (not shown). The sample rate is typically 50 kHz. One skilled in the art would recognize that the multiplexer 328 and ADC 330 may be included as a subsection of the processor 310, and would not require separate devices as illustrated.

The processor 310 receives the sampled ion data from the ADC 330 and executes the detection and evaluation algorithms according to embodiments of the present invention. The processor 310 is typically a digital signal processor (DSP) specifically designed to process large quantities of sampled data. The processor 310 may use internal or external memory in the course of performing the algorithms. Random access memory (RAM) is typically required to perform filtering or averaging of waveforms over many cycles of the engine. The processor 310 sends combustion feedback parameters to an engine control module, such as the engine control module 206 of FIG. 2. These parameters may include an incipient knock detection message for a specific cylinder. Other parameters may include ion peak location or knock intensity i.e. (incipient, moderate, heavy, or shutdown).

One skilled in the art would recognize that high cylinder count lean-burn engines can have as many as 24 cylinders or more. Accordingly, although 16 cylinders were referenced for purposes of illustration, the ignition, ion current sensing, and algorithms illustrated herein may be applicable to 24 cylinders or more. Furthermore, the system illustrated may contain two DSPs with integrated multiplexers and ADCs thereby allowing simultaneous processing of cylinders on both engine banks.

Figure 4:
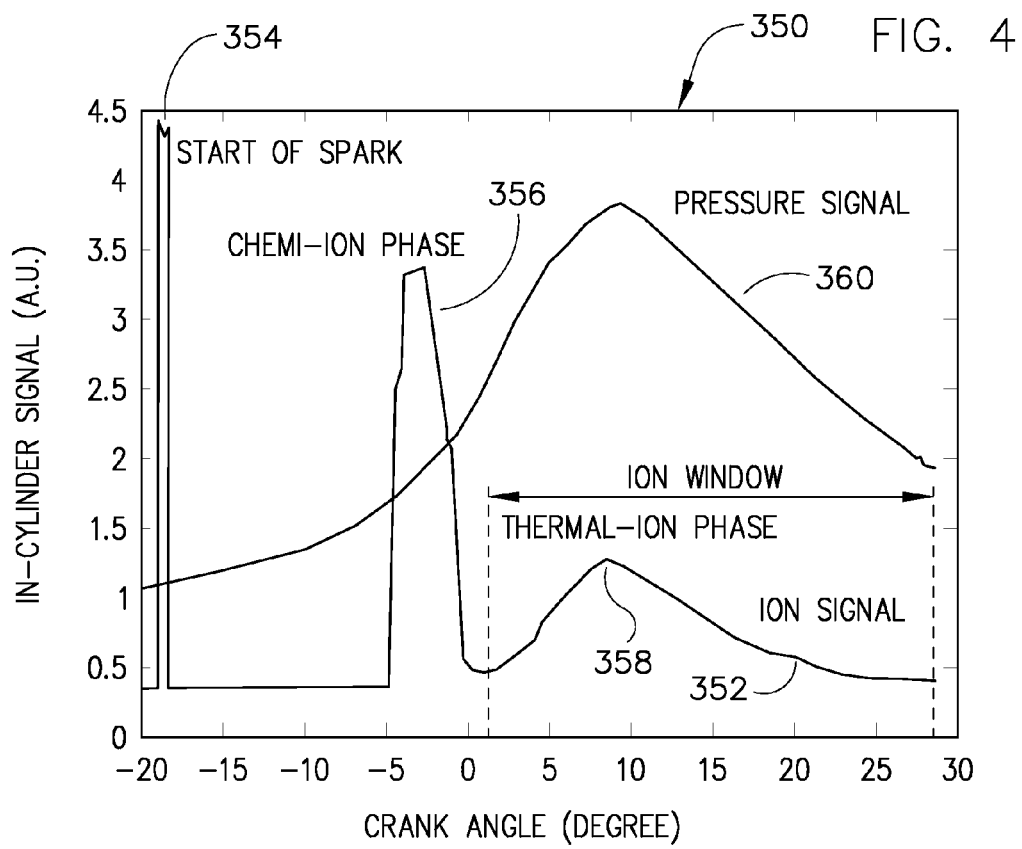
FIG. 4 is an illustration of a combustion process sensed by a pressure gage and an ion sensor according to an embodiment of the present invention.

FIG. 4 is an illustration 350 of the sequence of events, as a function of crank angle, that produces the ion signal 352 from a spark plug in a typical reciprocating engine. Based on the ion signal 352, the beginning of the combustion is clearly shown by a first peak 354, which is the ignition pulse or start-of-spark phase. Immediately following the spark, a flame kernel starts to form and grows between the spark plug electrodes. The proximity of the initial flame kernel to the ion probe generates significant ion flow, thus leading to a chemi-ion phase at 356. The peak 356 appearing in this phase of the ion signal 352 is the point where the ion formation equals the ion recombination.

Once the flame kernel leaves the gap, the flame finishes its early development and the ion signal 352 continues to decline due to recombination reactions. However, during the end of the compression stroke, the burned gas remaining in the vicinity of the spark plug gap is compressed by the moving flame front and moves back toward the spark plug, which results in a higher gas temperature around the spark gap. After a period of decline, the ion signal 352 starts to rise again and peak at 358 when the ion formation rate becomes stronger than the ion recombination rate. This also signifies that the reacting products remaining between the gap, which already have a very high temperature, are ionized again due to the temperature increase resulting from the compression. This new peak 358 is called the post-flame phase or the thermal-ionization phase. This post-flame phase 358 is related with the temperature and pressure rise and is the key phase in the ion signal 352. A corresponding pressure curve 360 correlates to the ion signal thermal ionization phase, and indicates the presence of oscillations or disturbances if knock is present. The post-flame phase 358 is crucial to collecting detonation information during knocking of the engine. After the post-flame peak 358, the ion formation declines rapidly, resulting in an indication of the end of combustion and the complete loss of ion signal 352. The process 350 then repeats for subsequent combustion cycles.

At lean fuel conditions, flame temperatures are typically not as high and post-flame ion peaks, such as peak 358 of FIG. 4, are not easily detected using previous-generation ion sensors. This has prevented flame ion sensing from being used to any significant extent in lean-burn engines. Moreover, in lean burn engines, the spark plug design, in conjunction with the gas-dynamic and thermodynamic characteristics of the combustion event, greatly affects the magnitude and repeatability of an ion signal. For example, on one hand, systems having spark plugs with a high electrode surface area and electrodes mostly shielded from the combustion chamber flow, provide higher magnitude and more consistent ion signals than other types of spark plugs. On the other hand, an ion signal is not easy to detect in lean burn engines using conventional "J-gap" automotive type spark plugs because the signal is of very low intensity and has great variability, often measured and referred to as a coefficient of variability (COV). Systems that use conventional "J-gap" automotive type spark plugs to detect an ion signal will not typically work properly in the case of lean-burn engines because these systems will get a weak post-flame signal or no signal at all. In a preferred form of the present invention, a shielded spark plug in conjunction with the ion circuitry is the ideal choice to measure ion signals. Thus, a mechanical shield around the ion probe prevents the interference of flame related noise with ion sensing elements and helps improve the signal-to-noise ratio of the post-flame ion signal detected by the diagnosis module.

Figure 5:
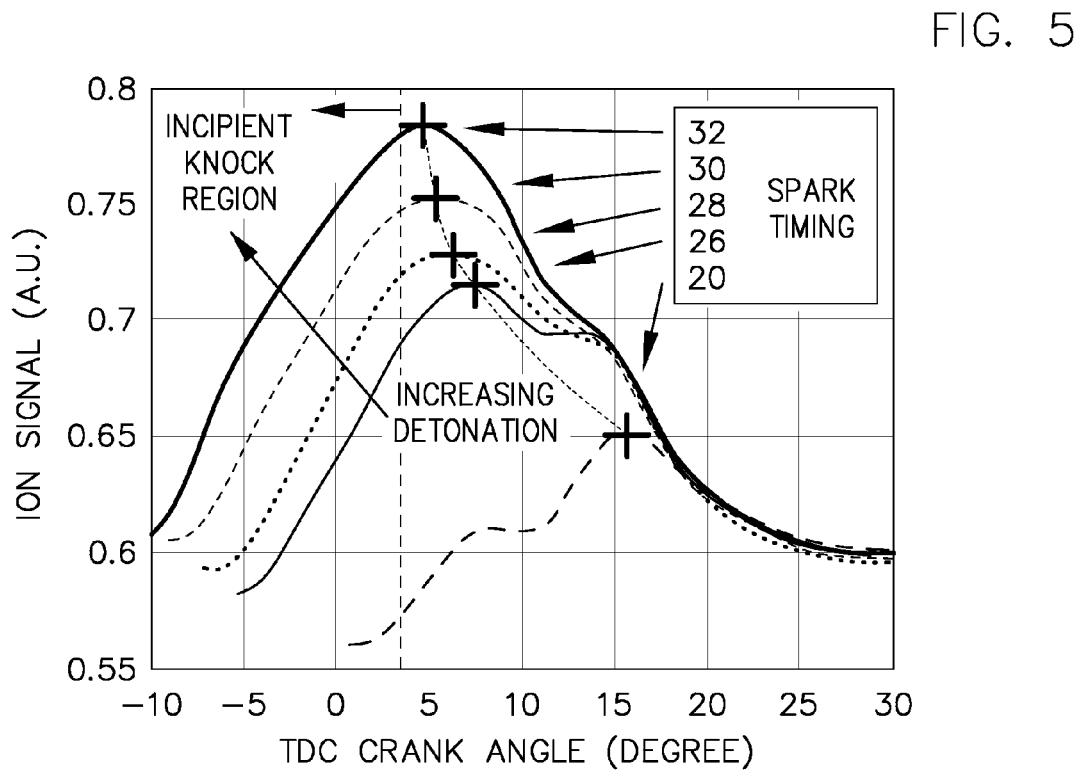
FIG. 5 is an illustration of a post-flame ion signal versus crank angle for various detonation crank angles.

FIG. 5 plots a graphical representation of the post-flame ion signal versus engine crank angle for decreasing detonation margin. This figure is the basis of the ion signal processing in a diagnosis module, such as the diagnosis module 202 of FIG. 2. The time for measuring knock in the ion signal has to be specified in terms of the engine crank angle degrees. Thus termed "knock-windowing" which helps to reduce the risk of knock misdetection. Knowing the start and stop time of the windowing also makes it possible to know in which cylinder knocking occurs, so that consideration can be taken during knock control (such as by retarding the spark timing). Knock control may be done on one cylinder where there is knocking, or it may be done on all cylinders. The controller must recognize when to start and stop the knock window in order to get the best possible knock detection. The window start and stop time depends on engine speed, engine angle and load, and the controller has a corresponding "look-up" table. In a preferred embodiment, the engine speed, cylinder-firing order and other engine parameters are provided to the engine control module prior to knock detection. A prescribed value of crank angle degree from the start of spark is specified as the start of knock window. In a preferred embodiment, a crank angle is chosen such that the chemi-ion peak, such as peak 356 of FIG. 4, is avoided from the ion signal analysis. A value is also specified for the length of the knock window. A typical value for the start of the knock window is 20 crank angle degrees from the start of spark, and the knock window length is approximately 40 crank angle degrees. However, one skilled in the art would recognize that higher or lower values of knock window start and length may be used depending on other engine parameters.

Signal processing of an ion signal in the knock window is used to characterize the severity of knocking in an engine. In lean-burn engines, the ion signal may be very noisy. Therefore, once the post-flame ion signal is detected, the acquired signal is filtered using low pass filters. The low pass frequency chosen can be a function of the engine speed, engine cylinder geometry and atmospheric conditions. A typical value of the low pass frequency chosen is around 1000 Hz. However, higher or lower values of low pass frequency may be used depending on engine parameters. Alternatively, the signal can be de-noised by convolution with appropriate ID filters or moving window averaging or weighted cycle averaging or a combination.

The filtered post-flame ion signal for a given combustion cycle is analyzed to determine the location of the peak amplitude in terms of crank angle degrees. Multi-cycle moving averages of the location of the peak amplitude of the filtered post-flame ion signal are computed. The number of cycles to average is defined based upon other ion signal characteristics and engine parameters. A typical value of the number of combustion cycles to average chosen is between 1 to 32 cycles typically 32 cycles.

Figure 6:
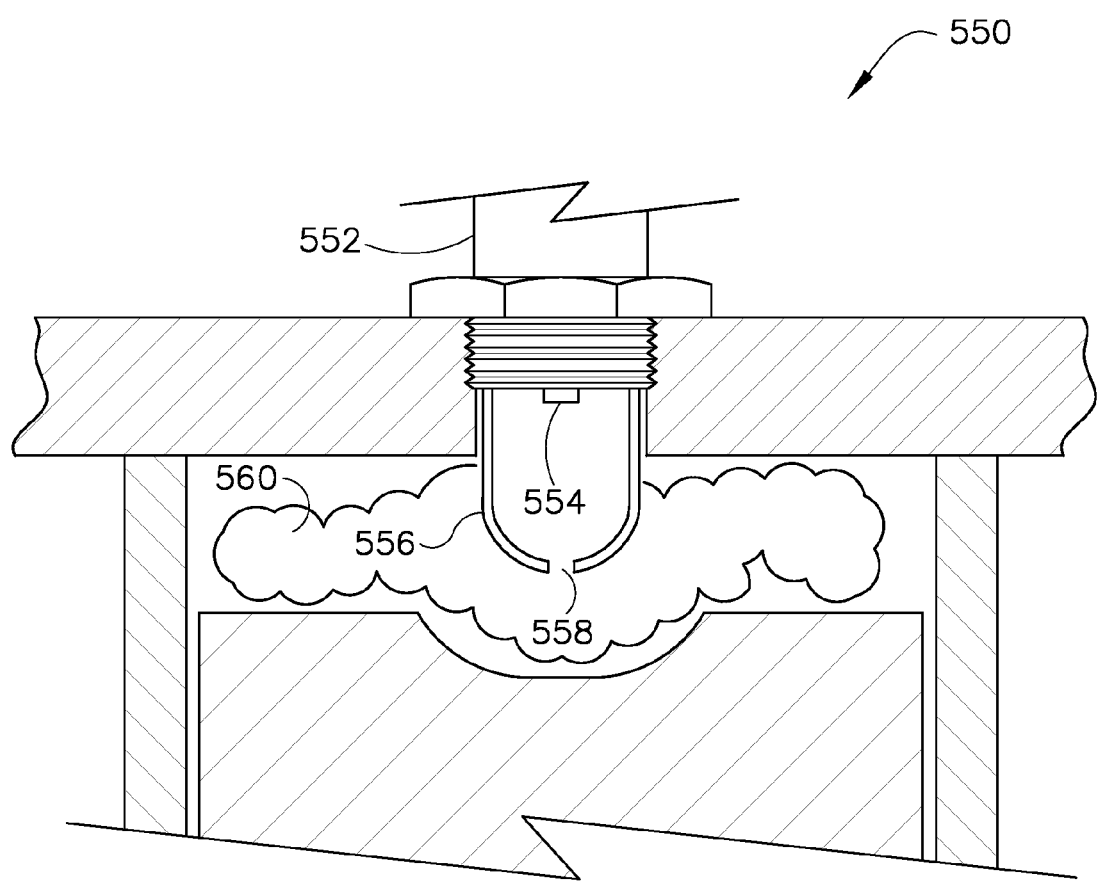
FIG. 6 illustrates a combustion chamber having a shielded spark plug according to an embodiment of the present invention.

FIG. 6 illustrates a lean burn reciprocating engine 550 having an igniter or spark plug 552 with electrode 554 according to an embodiment of the present invention. FIG. 6 illustrates an ion sensing electrode shield 556 that has been found to be beneficial for combustion sensing in lean burn IC engines. In the following discussion the ion sensing probe may be referred to as the spark plug, however, one skilled in the art would recognize that conventional ion sensors other than spark plugs may be used in the manner illustrated herein for ion sensing.

Prior art ion sensing systems typically use an ion probe or standard spark plugs as integrated ignition device and ion sensor. These sensors typically protrude into the combustion chamber and contact the combustion gasses containing ions. The chemical process of combustion creates many species of ions or charged particles. These ions may be visualized as a cloud 560 in the combustion chamber containing charged atoms and molecules of the combustion gasses. Applying a bias voltage creates an electric field between a sense electrode and a ground electrode i.e. (the entire combustion chamber). This electric field thereby causes ion movement between the electrodes. The movement of charged particles or more precisely the movement of electrons is the definition of current flow.

Within the cylinder, the ion density in the combustion chamber is a function of the average temperature and pressure of the combustion gasses. This property of the combustion gas ions is useful for engine control systems. As the cylinder pressure increases, so does the measured ion current. Thus a peak in the ion signal correlating to the peak of cylinder pressure is observed, as has been discussed. This happens during the thermal ion current phase, and the peak is referred to as the second hump of the ion signal, that is, peak 358 as illustrated in FIG. 4.

However, typical ion current waveforms measured with J-gap or other traditional spark plug in a lean burn engine deviate from the ideal pressure signal considerably. The ion current waveform exhibits large amounts of "combustion noise". This noise appears as random increases or decreases in the ion current throughout the duration of the ion sense window. If this noise is great enough it may appear that portions of the ion current curve are actually missing, thus creating difficulty in detecting the desired combustion properties.

In normal operation the air, fuel, and combustion gasses flow into and out of the combustion chamber at high rates. It is well known that the flow of these gasses causes turbulence or swirl in the combustion chamber during the combustion process. This turbulence causes the combustion gasses in the combustion camber to moving past the ion sense electrode 554 resulting in ion current instability or noise.

A shield or mechanical filter of the ion sensing electrode 554 reduces the ion current instability which may result from the movement of the combustion gasses 560. Accordingly, fewer momentary perturbations of the ion current and improved detection of the desired combustion parameters from the ion current waveform may result. One skilled in the art would recognize that the exact size and shape of the shield is dependent on the engine flow dynamics and may vary substantially with engine type.

Referring again to FIG. 6, an ion sensor shield 556 is shown. Note that the ion sense electrode 554 is illustrated by a protrusion to indicate that any type of spark plug gap may be shielded in by this method. Possible spark gap types include J-gap, fine wire, surface gap, or massive electrode. The sensor shield 556 completely encloses the ion sensor electrode 554 and one or more openings 558 are provided to allow the flow of combustion gasses to contact the ion sensor electrode 554. In this fashion the shield 556 prevents the turbulent flow of combustion gasses 560 from contacting the sensor electrode 554 directly. However, the shield 556 nevertheless allows combustion gasses more representative of the average cylinder ion density, and thereby cylinder pressure, to contact and be measured by the electrode 554. The result is a smoothed ion waveform that more closely correlates to cylinder pressure and enables improved combustion parameter detection.

The following FIGS. 7-13 illustrate control logic for a single cylinder. However, one skilled in the art would recognize that a control system for, for instance, a 16 cylinder engine would maintain essentially 16 separate copies of ion data and control parameters, one for each cylinder.

Figure 7:
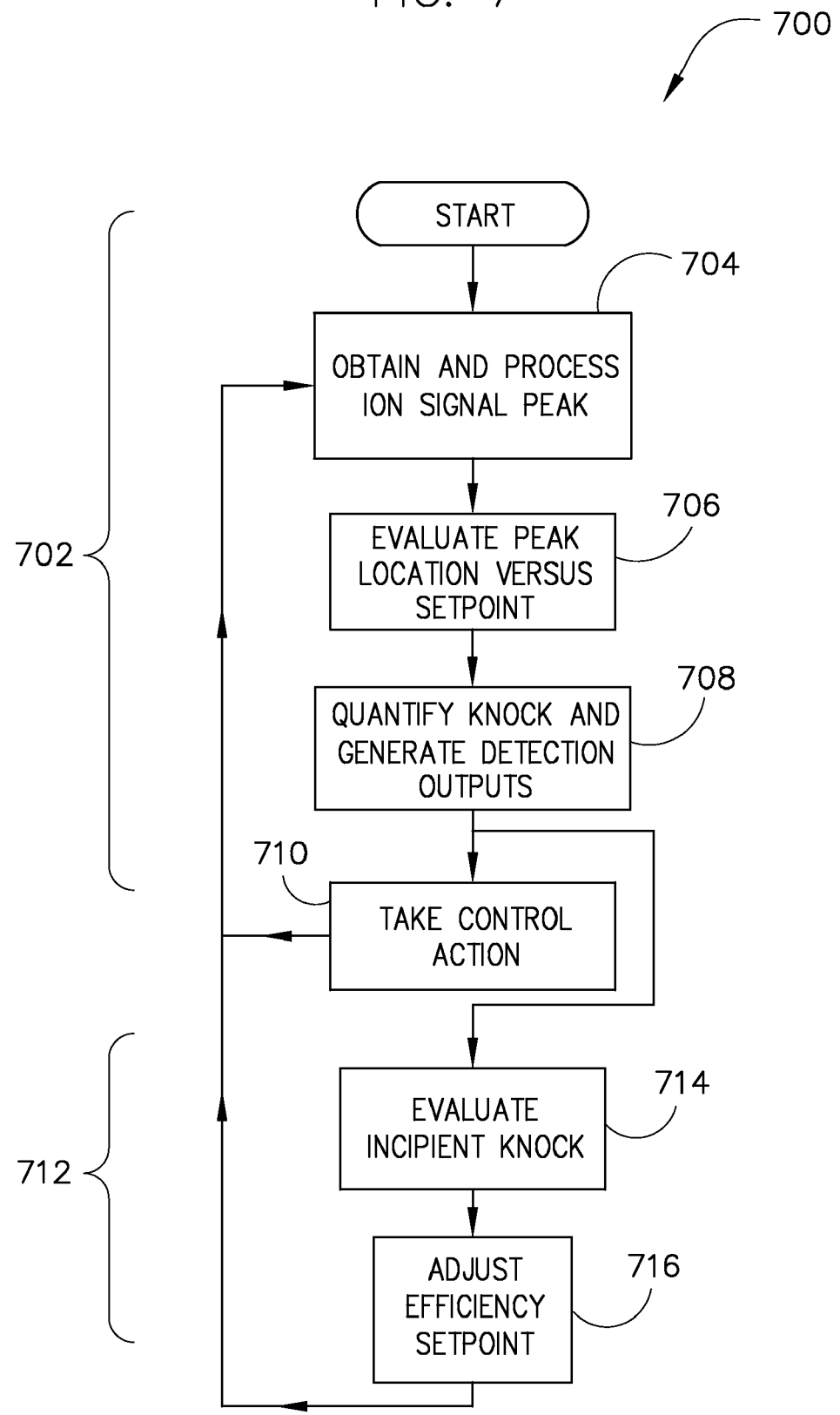
FIG. 7 illustrates an overview of an incipient knock control algorithm according to an embodiment of the present invention.

FIG. 7 illustrates a control algorithm 700 according to an embodiment of the present invention. An inside control, or fast response loop 702 provides incipient knock detection and prevention based on peak ion readings occurring in a short number of engine cycles. The fast response loop 702, based on ion control, typically obtains and processes ion signal peaks at 704, evaluates the peak location versus setpoint at 706, and quantifies the knock and generates detection outputs at 708. Once detection outputs are determined at 708, control action is taken at 710. Furthermore, however, the detection outputs at 708 are also used in a second loop 712 to evaluate incipient knock at 714 and adjust the efficiency setpoint at 716.

Figure 8:
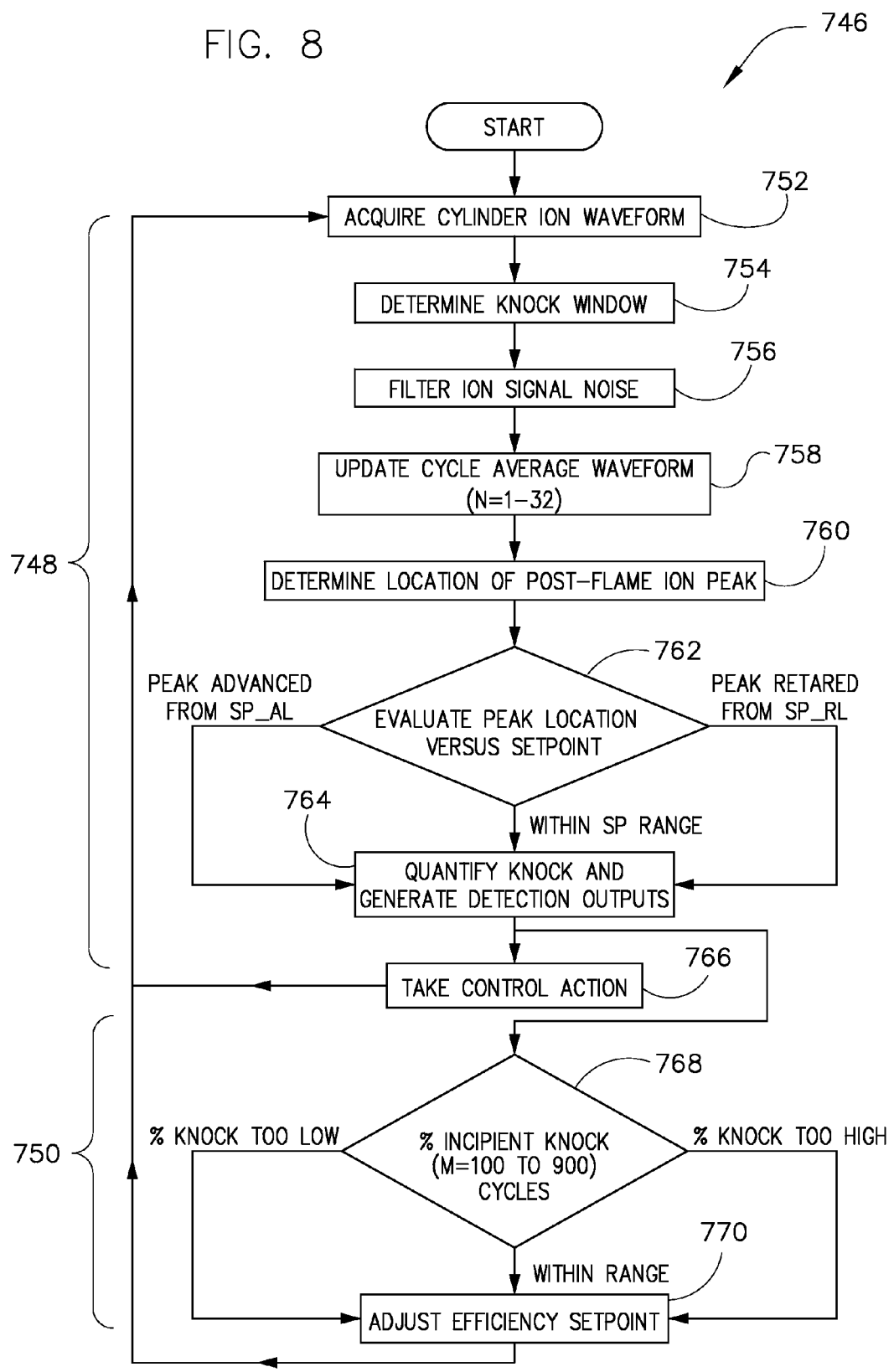
FIG. 8 illustrates an overview of an algorithm for controlling incipient knock according to an embodiment of the present invention.

FIG. 8 illustrates details of the general control algorithm 700 as illustrated in FIG. 7. In this embodiment, algorithm 746 includes an inside control, or fast response loop 748 that provides incipient knock detection and prevention based on peak ion readings occurring in a short number of engine cycles, typically 1 to 15 engine cycles (<1 second) while an outside or slower control loop 750 maintains an efficient setpoint for the present fuel quality or operating conditions and responds within 100 to 900 engine cycles (typically>1 minute). The first step in the process 752 is to acquire ion waveform data for the current firing cylinder. The knock window for the given parameters is identified at 754, and the data is the filtered 756, cycle averaged 758, and the ion peak location is determined at 760.

At 762 the peak location versus setpoint evaluation block performs the simple task of comparing the current average peak location with the upper and lower setpoint limits. If the current peak location is more advanced than the setpoint advance limit (SP_AL), the function generates a flag signaling that the current peak is advanced, or an incipient knock. If the current peak is within the limits a flag signals then no control action is required. If the peak is more retarded than the setpoint retard limit (SP_RL) a flag states that the peak is retarded.

At 764, if knock has been detected, the knock is quantified and combustion parameter outputs are adjusted to prevent knock or maintain ion peak location within the setpoint range. At 764, some history of the previous combustion cycles is maintained, which is used to determine the proper output parameters to an engine control module, such as the engine control module 206 of FIG. 2.

Control action is taken at 766 wherein the engine and/or ignition control system response to the current combustion cycle is determined. Appropriate responses can be programmed for a particular engine. For example, the response to the detection of an incipient knock could be to retard the timing 0.5 degrees for a typical engine.

At 768 the efficiency setpoint is evaluated. This block maintains a large history of up to 900 or more combustion cycles and determines the number of incipient knock combustion cycles detected for the current cylinder in the last 100 to 900 cycles. The percent incipient combustion cycles is then compared to a desired target. An output is generated signaling that the level of incipient knock is either within range or out of range requiring an adjustment to the ion peak location setpoint.

Block 770 provides an ion peak setpoint adjustment if necessary. Ideally the maximum efficiency point for a given fuel quality would be obtained when the ion peak setpoint is at the edge of incipient knock. If the setpoint is at this location, very limited numbers of incipient knocks will be detected and the fast control loop 748 will make very few adjustments to maintain the peak locations within the setpoint range. However, if for instance the fuel quality drops, the fast control loop 748 will detect incipient knock at an increased rate as it attempts to maintain an ion peak at too advanced a crank angle for the fuel quality. If this condition persists, the slower efficiency control loop 750 will retard the setpoint appropriately to maintain the target incipient knock rate.

Referring still to FIG. 8, an A/D converter samples the ion current at a minimum sample rate of 10 kHz (typically 50 kHz) and filters at 756 to reduce noise, with a two sample moving average filter as they are stored in a buffer. This buffered combustion cycle waveform then updates a multi cycle average ion waveform. The multi-cycle average can be from 1 to 32 cycles (typically 32), and is updated at 758. The averaged waveform is then processed at 760 to determine the ion peak location in crank angle degrees. The ion peak location is then passed at 762 to the peak evaluation versus setpoint function.

Figure 9:
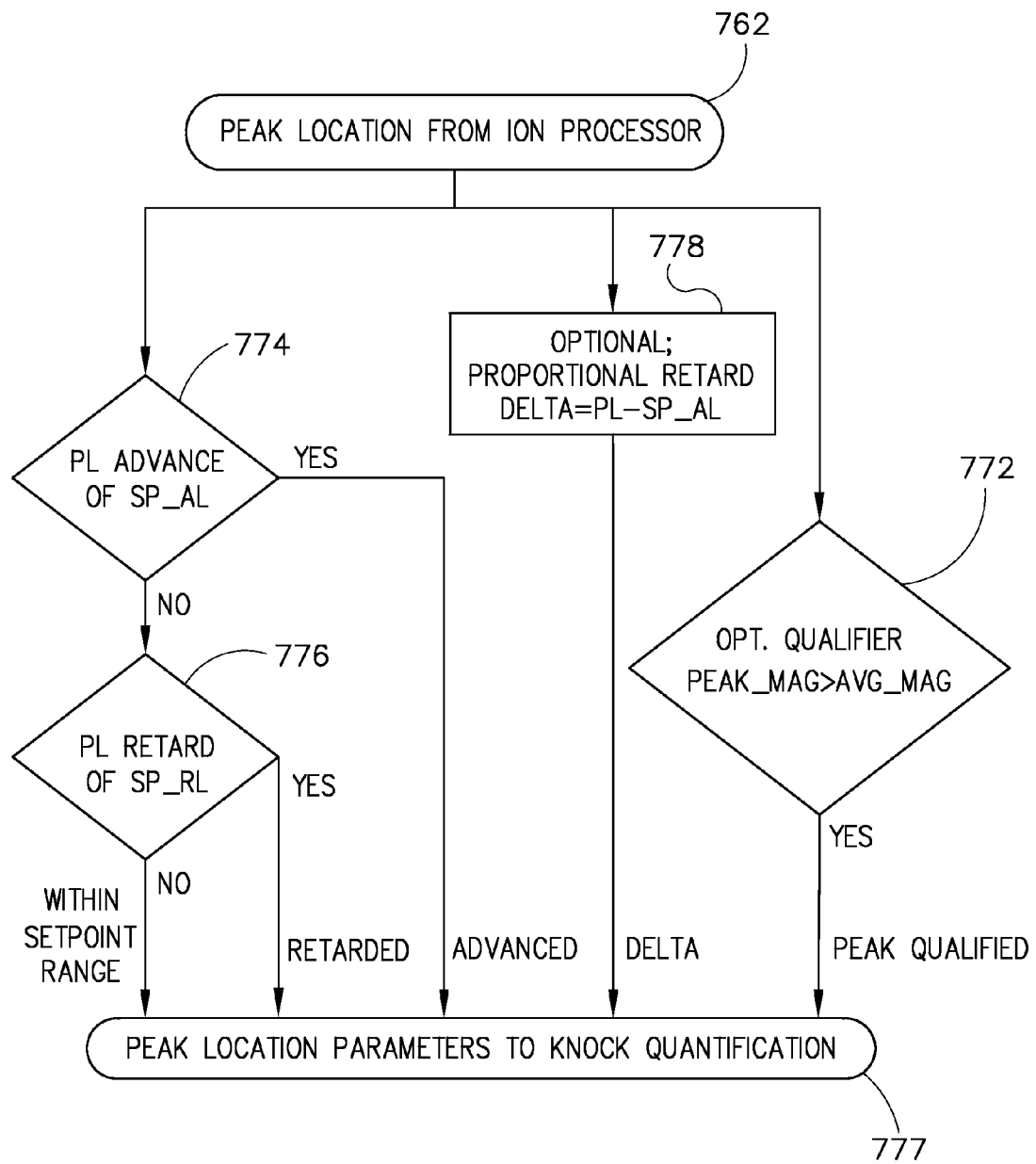
FIG. 9 illustrates an ion signal peak location evaluation algorithm according to an embodiment of the present invention.

FIG. 9 illustrates details of the peak location evaluation function 762 of FIG. 8. Of interest here is the optional proportional retard function 778. If this function 778 is used, and the current peak is advanced, the difference "delta" between the SP_AL and the current peak location (PL) is calculated. This value can be used as a multiplier of the retard timing step implemented by the engine control or ignition system. In this way a peak location that is greatly advanced, most likely a more severe incipient knock, will cause a larger retard timing step.

Furthermore, FIG. 9 includes an optional peak magnitude qualifier 772. In most cases incipient knock detection can be effectively determined simply by peak location. However, some applications with large peak location COV (coefficient of variation), due to less stable combustion, may experience false knock detections and may benefit from the magnitude qualifier function 772. This function 772 compares the magnitude of the current cycle peak to a multi-cycle moving average of the peak magnitude. If the current peak is both more advanced than the SP_AL, and larger in magnitude than the multi-cycle moving average, it can be more accurately determined to be a knocking cycle. As discussed with respect to FIG. 13, the peak location (PL) is assessed against the SP_AL at 774, and also against the SP_RL at 776, to determine at 777 whether to advance or retard the timing.

Figure 10:
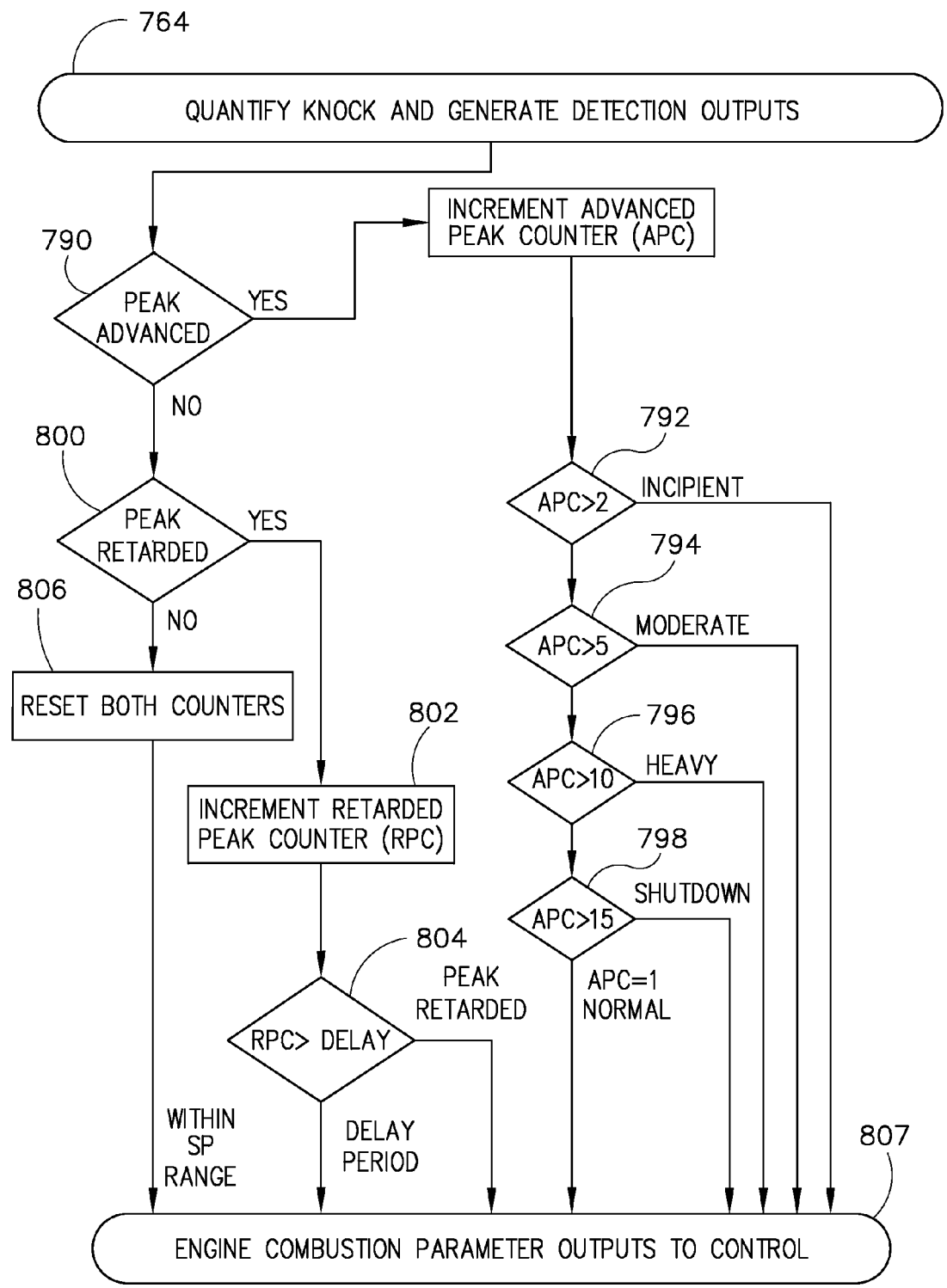
FIG. 10 illustrates an event counting algorithm according to an embodiment of the present invention.

Referring back to FIG. 8, the knock is quantified at 764. This function 764 receives its input from the peak location versus setpoint evaluation block 762 and generates combustion parameter outputs including incipient, moderate, or heavy knock detection. Additional detail for this block is shown in FIG. 10. This block 764 uses an event counting method to determine the correct combustion parameters and recommended control action. In the case of several combustion events with advanced peaks 790, the advanced peak detection for each cycle will cause the advance peak counter (APC) to be increased by one count.

In a preferred embodiment and referring to FIG. 10, at 792 if the count is less than 2, an isolated insipient knock is ignored as being in the normal noise level. For other engines with more stable combustion the detection can be triggered on the first advanced peak location. In either case when the desired count is reached the engine controller's response would typically be to retard the timing by the preset retard step. Typically detection of a few incipient knock cycles would trip the ignition control to retard the timing sufficiently to prevent knock. However, during severe operating point or fuel transients more than 2 advanced peaks in sequence may be detected. In the case that 5 or 10 advanced peaks are detected, at 794 and 796 respectively, a moderate or heavy knock can be flagged, thus signaling the engine controller to retard the timing by a larger degree step. Finally in the unlikely event that the engine controller retard action does not eliminate knock events in within the allowable system response time, at 798 a shutdown (or major system fault) recommendation can be generated. The engine controller can then take action to protect the engine from damage. In any case when a peak location is within the setpoint range the APC counter is reset and armed to detect the next knock event.

Similarly, at 800, if the peak location is not advanced 790, but is retarded, the retarded peak counter (RPC) is increased by one count at 802. In this case the timing is advance very slowly to allow the cylinder components, predominantly the spark plug, to cool after one or more knock events causing the timing to be retarded. If the timing is advanced too rapidly after knock events, additional heating of the cylinder can cause more severe knock and a shutdown of the engine may be required to prevent engine damage. Therefore, at 804 a delay count threshold is implemented that requires typically 20 retarded peak detections before signaling the engine controller to advance the timing by a predetermined advance step. Again if a peak location is within the setpoint range the RPC counter is reset and armed to start counting the next sequence of retarded peaks. Counters are reset at 806 under conditions where the peak is neither advanced nor retarded. Engine combustion parameters are output to the controller at 807.

Figure 11:
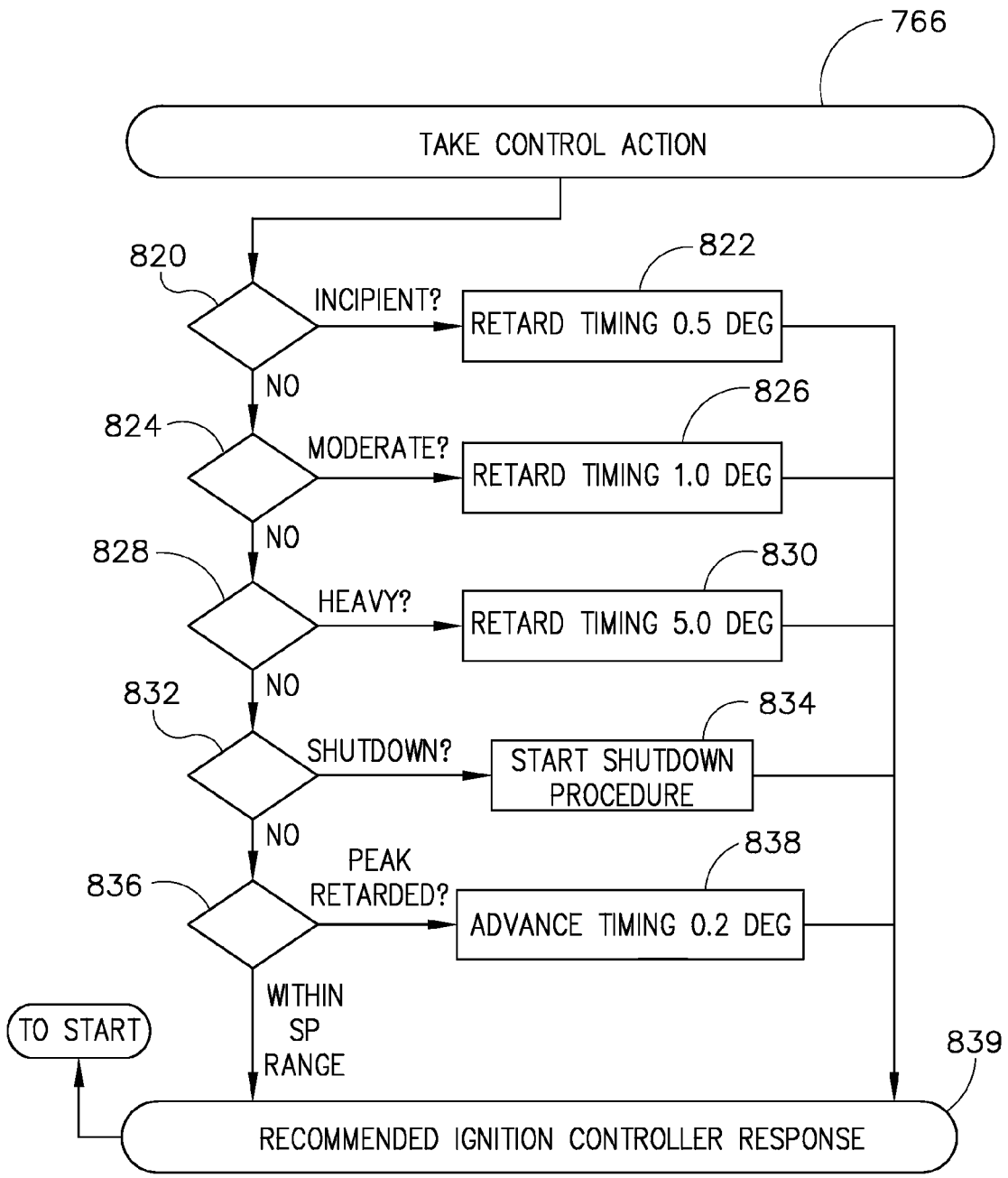
FIG. 11 illustrates an ignition controller response to combustion parameters according to an embodiment of the present invention.

FIG. 11 illustrates a detailed set of recommended engine and ignition controller responses 766 that may be taken, based on the quantification of knock at 764 in FIG. 8. As illustrated, at 820 a typical response to an incipient knock detection is a 0.5 degree timing retard 822. Next, at 824 if knock is deemed to be moderate, a typical response is to retard the timing by 1.0 degree at 826. At 828 if knock is deemed to be heavy, a typical response at 830 is to retard the timing by 5.0 degrees. Finally, if shutdown knock is detected at 832, a typical response at 834 is to initiate a shutdown procedure. Adjustments to the controller are made at 839.

In operation, if knock has been detected due to a fuel quality transient, but the fuel later returns to the previous quality, the timing may temporarily be retarded more than required for the current conditions. This would result at 836 in a series of retarded peak locations. The typical engine control response to retarded peak locations is to advance the timing in 0.2 degree steps at 838 every 20 retarded peaks. This slow response allows the cylinder components to cool after knock events preventing additional knocking cycles. Typically the timing returns to the setpoint within several seconds, to around a minute, depending on how many degrees the timing was retarded during the knock event. A large knock event may retard the timing 5 to 10 degrees.

However, in most cases moderate, heavy, or shutdown knock events will not be detected. The responses illustrated 824, 828, 832, and 836 are present only to provide a proportional response to large knock events due to extreme transients, or a shutdown signal in the event of uncontrollable detonation or knock typical of pre-ignition. Pre-ignition is a condition where the internal temperatures of the cylinder are high enough that the spark is no longer required to ignite the mixture. Thus, the cylinder surface temperatures, typically the plug electrodes, are high enough that under the pressure of the combustion stroke auto-ignition (or dieseling) occurs. This is a thermal runaway condition where the early ignition of the mixture causes the cylinder temperature to continue to rise causing even earlier auto-ignition. Under these conditions spark timing retard has little or no effect and engine shutdown, or fuel cutoff, is the only remedy.

Figure 12:
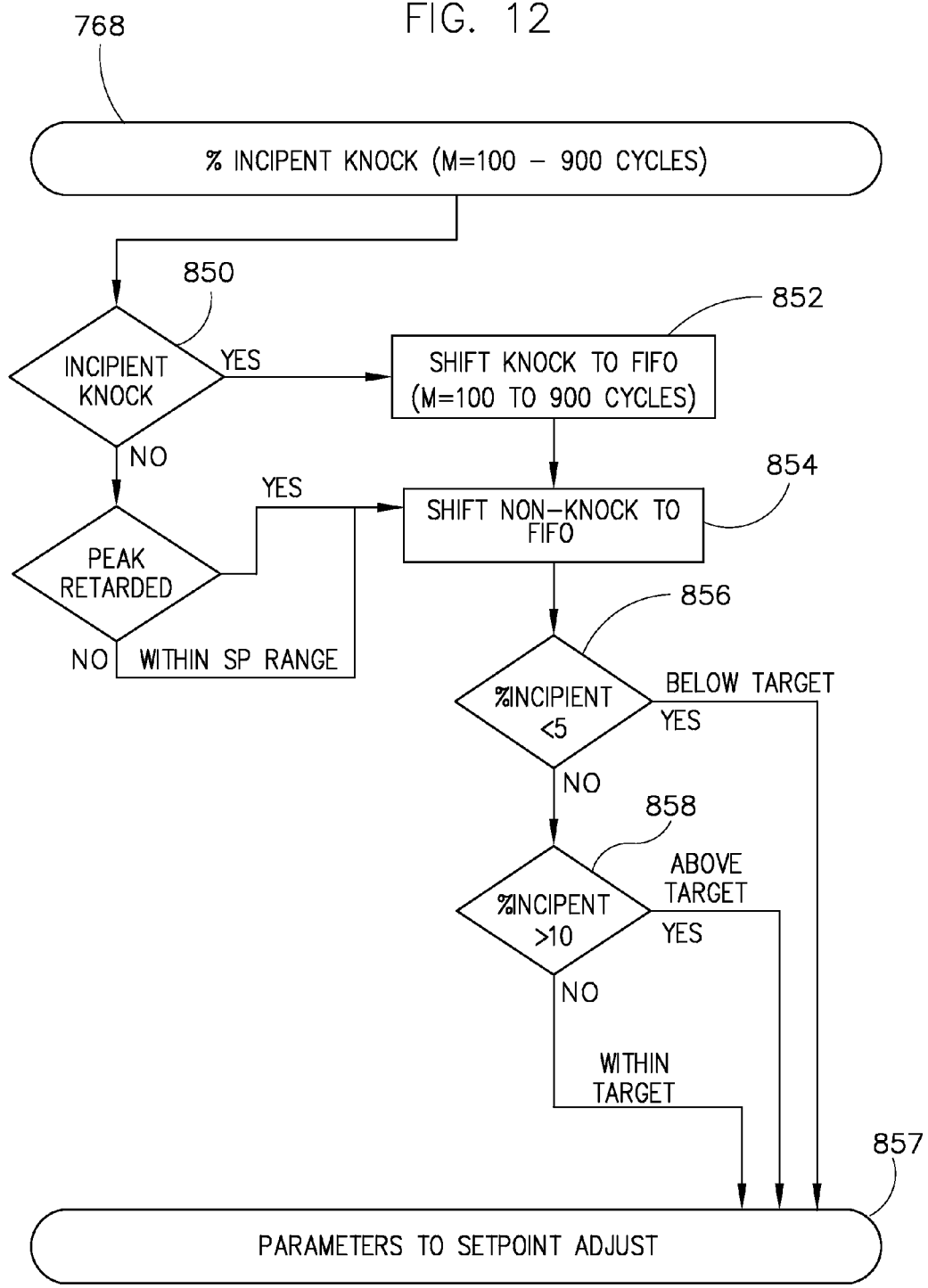
FIG. 12 illustrates an incipient knock algorithm and engine adjustment parameters according to an embodiment of the present invention.

FIG. 12 illustrates details of evaluation of the assessment of the percent of incipient knock, as illustrated at 768 in FIG. 8. Maximum efficiency is typically at the most advanced timing possible without incurring knock, or a slightly retarded offset from this point. This varies slightly with the type of engine. According to an embodiment of the present invention, the ion peak location setpoint is adjusted by the efficiency incipient knock evaluation routine in an attempt to maintain the ideal ignition timing for a given fuel quality or operating condition. This functional block 768 maintains a knock detection history of between 100 to 900 combustion cycles. Any knocking cycle classified as an incipient knock or greater at 850 is logged in the buffer or FIFO (first-in first-out shift register) at 852, and any non-knocking cycles are also logged at 854. A target incipient knock frequency rate of only a few cycles per 100 is desirable to place the setpoint at the edge of incipient knock. The number of incipient knocking cycles in the last 100 to 900 engine cycles is thus compared to this target level. At 856, if the frequency rate of incipient knock events is below the target value maximum efficiency may not be obtained, and at 857 the setpoint adjustment routine is signaled to advance the setpoint to better take advantage of the higher fuel quality currently available. At 858, if the frequency rate of incipient knock events is above the desired target, the fuel quality cannot enable operation at such an advanced setpoint. Therefore, at 857 the setpoint adjustment routine is signaled to retard the setpoint. As illustrated, no action is required if the incipient knock frequency rate is within the target range of 5 to 10%.

Figure 13:
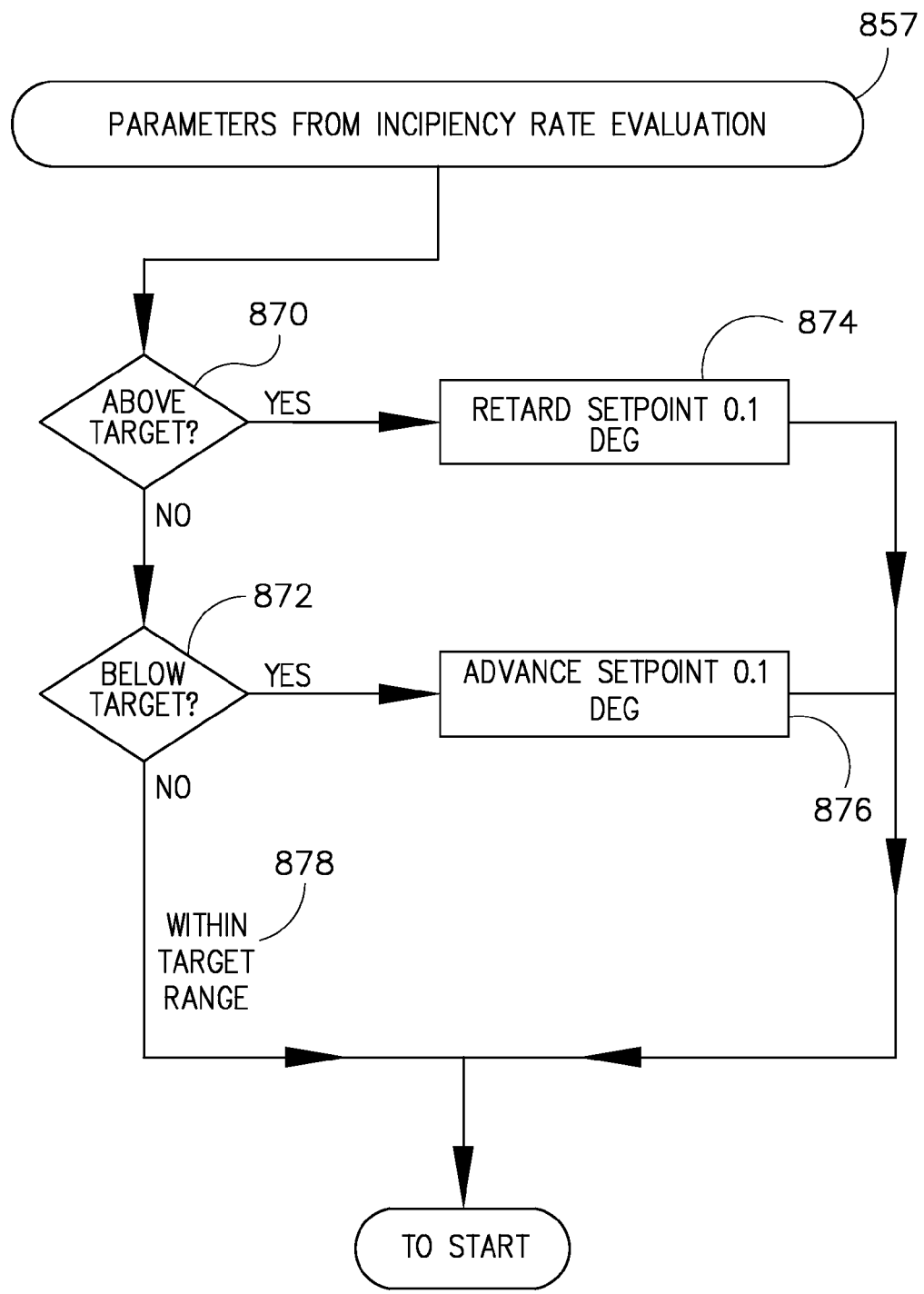
FIG. 13 illustrates an incipient knock algorithm to retard or advance ignition setpoint according to an embodiment of the present invention.

Details of setpoint adjustment routine 857 from FIG. 12 are illustrated in FIG. 13. This function 857 simply receives an "Above Target" indication 870 or "Below Target" indication 872 from the efficiency incipient knock evaluation block 768 of FIG. 8, and retards 874 or advances 876 the setpoint by a predetermine increment. These step sizes, or gains, may be tuned for best performance and efficiency for the gas quality fluctuations typical for a given installation site. The quality of natural gas may vary greatly and the ranges over which the quality or methane number change and the rate of change are not generally known. Therefore, some empirical tuning of the sensitivity or target range, and the control response time or timing step size for a given installation site may be required. Note that hard limits are used for the maximum setpoint advance and retard (i.e. 0.1 degree in both cases, as an example). This prevents operating the engine outside of reasonable limits in the case that unreasonable operating conditions exist.

It is important to note that there are both advance and retard setpoint markers used for the actual peak location evaluation. This provides a dead band wherein the setpoint is within range at 878 and for which the control takes no action. This simply provides a band around the setpoint such that normal peak location jitter (or peak location noise) does not cause excessive control loop adjustments. One skilled in the art would recognize that the width of the setpoint band may be slightly different from one engine type to another and 0.1 degree increments of adjustment are made for purposes of illustration only.

In an alternate embodiment of the present invention, it may be desirable to operate at an offset retarded from the incipient knock threshold. This is equivalent to using wider setpoint range such that the limit cycle behavior effectively allows the average setpoint to be maintained at the desired offset from the incipient knock threshold. Once the incipient knock threshold has been reached using a larger retard step to place the setpoint at the desired retard offset.

In another embodiment, this same offset operation may be accomplished as follows. In this case once the incipient knock threshold is reached the setpoint would be retarded by a preset offset amount. The setpoint would then remain in an open loop (or fixed) mode for an acceptable time period. An automatic calibration cycle would then be required at regular intervals to ensure that the setpoint is maintained at the desired offset from the incipient knock threshold. The calibration cycle would require temporary closed loop operation of the setpoint routine to make a short excursion advancing the setpoint to the incipient knock threshold. Upon determining the incipient knock threshold, the setpoint would again be retarded by the desired offset and the setpoint would again remain in open loop or fixed for an acceptable period of time.

After the completion of the final functional block, the control system repeats the same control flow for the next cylinder in the firing order. Then after completing evaluation of all cylinders for a particular engine, the process repeats with the first cylinder in the firing order. Ion data and control parameters are maintained for each individual cylinder of the engine. The engine controller then evaluates combustion parameters for all cylinders of the engine and initiates individual cylinder or global control actions related to a plurality, or even all, cylinders. Also, note that some control actions may be global (or pertaining to all cylinders) not limited to a severe knock condition requiring engine shutdown is one such example.

The aforementioned control system is the result of a simple attempt to create a control algorithm capable of protecting an engine and maintaining maximum efficiency. The initial approach has been to use a nonlinear controller with a setpoint dead band and higher retard gain than advance gain. This approach provided good proof of concept test performance. However, by its nature it would likely exhibit a limit cycle whereby performance may not be optimal. Therefore, there is no attempt to limit or preclude other control algorithm approaches. A linear control algorithm with no dead band and equal retard and advance gains may also provide satisfactory or improved performance.

The present invention has been described with respect to the use of a spark plug as an ion sensor in a reciprocating internal combustion engine to identify and operate at the onset of incipient knock, wherein the spark plug has an electrode that serves for both purposes of providing spark and sensing an ion current during the combustion process. One skilled in the art will appreciate that ion sensors in general will be applicable in a number of applications according to embodiments of the present invention. In this regard, it is appreciated that various sensors or plug designs can readily be optimized for a given application without departing from the spirit and scope of the appending claims.

It is understood that for certain engine applications a shielded spark plug in unnecessary to practice aspects of this invention. One skilled in the art may recognize that an ion current may be detected by an electrode of a spark plug without having a shield and, as such, detection of incipient knock with a conventional and exposed electrode may provide acceptable performance.

Therefore, in accordance with one embodiment of the present invention, a system for controlling knock in a lean burn internal combustion (IC) engine includes a spark plug having an electrode, an electrical circuit, and a controller. The electrical circuit is configured to provide a first voltage to the electrode and detect an ion current during a thermal-ionization phase of the combustion process, and provide a second voltage to the electrode to create a spark and initiate a combustion process within the combustion chamber. The controller is configured to monitor the ion current for a knock condition that includes at least an incipient knock condition, determine a crank angle of the IC engine where the incipient knock occurs, and adjust timing of the IC engine to operate at a crank angle that does not exceed a threshold level beyond inception of incipient knock.

In accordance with another embodiment of the present invention, a method for combustion feedback control of a lean-burn reciprocating engine using ion signals includes the steps of positioning a spark plug having an electrode, the spark plug positioned within a combustion chamber and initiating combustion within the combustion chamber by providing a voltage to the electrode. The method further includes measuring an ion current using the electrode during combustion, and adjusting timing of the IC engine to within onset of incipient knock using the measured ion current to avoid engine knock.

According to another embodiment of the present invention, a closed-loop controller for a spark-ignition internal combustion (IC) engine includes a control to detect an ion current within a combustion chamber of the IC engine using an electrode of a spark plug, determine a desired crank angle for ignition from the ion current wherein incipient knock begins to occur, and continually monitor and adjust ignition timing of the IC engine to operate at or below inception of incipient knock.

According to still another embodiment of the present invention, a system for controlling knock in a lean burn internal combustion (IC) engine includes an electrical circuit configured to provide a first voltage to an igniter and detect an ion current during a thermal-ionization phase of the combustion process, and provide a second voltage to the igniter to create a spark and initiate a combustion process within a combustion chamber. A controller is configured to monitor the ion current for a knock condition that includes at least an incipient knock condition, determine a crank angle of the IC engine where the incipient knock occurs, and adjust timing of the IC engine to operate at a crank angle that does not exceed a threshold level beyond inception of incipient knock.

The present invention has been described in terms of the preferred embodiment, and it is recognized that equivalents, alternatives, and modifications, aside from those expressly stated, are possible and within the scope of the appending claims.

What is claimed is:

1. A system for controlling knock in a lean burn internal combustion (IC) engine comprising:
   a spark plug having an electrode;
   an electrical circuit configured to:
      provide a first voltage to the electrode and detect an ion current during a thermal-ionization phase of the combustion process; and
      provide a second voltage to the electrode to create a spark and initiate a combustion process within a combustion chamber; and
   a controller configured to:
      monitor the ion current for a knock condition that includes at least an incipient knock condition that is determined based on a peak amplitude of the ion current during post-flame ionization;

determine a crank angle of the IC engine where the incipient knock occurs; and adjust an ignition timing of the IC engine to operate at a crank angle that does not exceed a threshold level beyond inception of incipient knock.

2. The system of claim 1 wherein the knock condition further includes at least one of moderate knock, heavy knock, and shutdown knock.

3. The system of claim 2 wherein the controller is further configured to retard the ignition timing if a knock condition is identified.

4. The system of claim 2 wherein the knock condition is determined based on a number of advanced peaks that occur sequentially.

5. The system of claim 1 wherein the incipient knock is identified for at least two sequential advanced peaks.

6. The system of claim 1 wherein the controller adjusts the ignition timing based on an algorithm having both a fast response loop and a slow response loop.

7. The system of claim 6 wherein the fast response loop includes an assessment of incipient knock using between 1 and 15 engine cycles, and the slow response loop includes an assessment of incipient knock using between 100 and 900 engine cycles.

8. The system of claim 1 further comprising a shield surrounding the electrode that acts as a mechanical filter to shield the electrode from combustion noise or turbulence.

9. The system of claim 8 wherein the shield has an opening opposite the electrode.

10. A method for combustion feedback control of a lean-burn reciprocating engine using ion signals, the method comprising the steps of:

positioning a spark plug having an electrode, the spark plug positioned at least partially within a combustion chamber of the engine;

initiating combustion within the combustion chamber by providing a voltage to the electrode;

measuring an ion current using the electrode during combustion;

comparing a magnitude of the measured ion current to a moving average of a peak magnitude to determine an onset of incipient knock; and adjusting an ignition timing of the IC engine to the onset of incipient knock to reduce a detonation margin.

11. The method of claim 10 wherein the incipient knock condition is identified as having at least two sequential advanced peaks.

12. The method of claim 10 wherein the ignition timing is adjusted proportionally to the difference between a peak location and a set point.

13. The method of claim 10 further comprising measuring the ion current during a thermal-ionization phase of the combustion process.

14. The method of claim 10 further comprising evaluating the incipient knock rate of the engine and adjusting the ignition timing to optimize thermal efficiency.

15. The method of claim 14 further comprising evaluating the incipient knock rate over approximately 100 to 900 engine cycles to optimize thermal efficiency.

16. A closed-loop controller for a spark-ignition internal combustion (IC) engine comprising:

a control to:

detect an ion current within a combustion chamber of the IC engine using an electrode of a spark plug;

determine a low pass filter frequency based on one of an engine speed, an engine cylinder geometry, and an atmospheric condition;

filter the ion current using a low pass filter having the determined low pass filter frequency;

determine a desired crank angle for ignition from the ion current wherein incipient knock begins to occur; and continually monitor and adjust an ignition timing of the IC engine to operate at or below inception of incipient knock.

17. The controller of claim 16 wherein the control further initiates combustion within the IC engine using the electrode.

18. The controller of claim 16 wherein the control identifies incipient knock when one or more advanced peaks occur sequentially.

19. The controller of claim 16 wherein the control identifies the IC engine as having one of an incipient, moderate, heavy, and shutdown level of knock and adjusting the ignition timing based on that identification to operate at or below inception of incipient knock.

20. A system for controlling knock in a lean burn internal combustion (IC) engine comprising:

a spark plug having an electrode, a shield enclosing the electrode and having an opening therein to allow combustion gasses to contact the electrode;

an electrical circuit configured to:

provide a first voltage to an igniter and detect an ion current during a thermal-ionization phase of the combustion process; and provide a second voltage to the igniter to create a spark and initiate a combustion process within a combustion chamber; and a controller configured to:

monitor the ion current for a knock condition that includes at least an incipient knock condition;

determine a crank angle of the IC engine where the incipient knock occurs; and adjust an ignition timing of the IC engine to operate at a crank angle that does not exceed a threshold level beyond inception of incipient knock.

* * * * *

UNITED STATES PATENT AND TRADEMARK OFFICE
CERTIFICATE OF CORRECTION

PATENT NO.        : 7,798,124 B2
APPLICATION NO. : 11/864820
DATED             : September 21, 2010
INVENTOR(S)       : Barrett et al.

It is certified that error appears in the above-identified patent and that said Letters Patent is hereby corrected as shown below:

Col. 1, line 19, delete "lean-bum engine" and
    substitute therefore -- lean-burn engine --; and Col. 1, line 31, delete "bum operation" and
    substitute therefore -- burn operation --; and Col. 1, line 38, delete "during lean-bum" and
    substitute therefore -- during lean-burn --; and Col. 1, line 40, delete "lean-bum operation" and
    substitute therefore -- lean-burn operation --.

Col. 2, line 8, delete "in a lean-bum" and
    substitute therefore -- in a lean-burn --; and Col. 2, line 17, delete "lean-bum operation" and
    substitute therefore -- lean-burn operation --; and Col. 2, line 28, delete "lean-bum reciprocating" and
    substitute therefore -- lean-burn reciprocating --; and Col. 2, line 37, delete "lean bum internal" and
    substitute therefore -- lean burn internal --; and Col. 2, line 52, delete "of a lean-bum" and
    substitute therefore -- of a lean-burn --.

Col. 3, line 67, delete "lean-bum reciprocating" and
    substitute therefore -- lean-burn reciprocating --.

Col. 4, line 11, delete "bum engines." and
    substitute therefore -- burn engines. --; and Signed and Sealed this Fourteenth Day of December, 2010

David J. Kappos
*Director of the United States Patent and Trademark Office*

Col. 4, line 21, delete "lean-bum reciprocating" and
substitute therefore -- lean-burn reciprocating --; and Col. 4, line 24, delete "lean-bum reciprocating" and
substitute therefore -- lean-burn reciprocating --.

Col. 8, line 57, delete "bum engines" and
substitute therefore -- burn engines --.

Col. 9, line 53, delete "ID filters" and
substitute therefore -- 1D filters --.

Col. 16, line 18, delete "lean-bum reciprocating" and
substitute therefore -- lean-burn reciprocating --; and Col. 16, line 37, delete "in a lean bum" and
substitute therefore -- in a lean burn --.